US012739408B2

(12) United States Patent
Sim et al.

(10) Patent No.: US 12,739,408 B2
(45) Date of Patent: Sep. 15, 2026

(54) METHOD AND APPARATUS FOR SELECTING REFERENCE SAMPLE FOR DERIVING CROSS-COMPONENT RELATION MODEL IN INTRA PREDICTION

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Seung Jin Park, Guri-si (KR); Min Hun Lee, Uijeongbu-si (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/865,899

(22) PCT Filed: May 2, 2023

(86) PCT No.: PCT/KR2023/005951

§ 371 (c)(1),
(2) Date: Nov. 14, 2024

(87) PCT Pub. No.: WO2023/224290

PCT Pub. Date: Nov. 23, 2023

(65) Prior Publication Data

US 2025/0343927 A1 Nov. 6, 2025

(30) Foreign Application Priority Data

May 18, 2022 (KR) ........................ 10-2022-0060670
Apr. 27, 2023 (KR) ........................ 10-2023-0055540

(51) Int. Cl.
*H04N 19/186* (2014.01)
*G06V 10/75* (2022.01)
(Continued)

(52) U.S. Cl.
CPC ......... *H04N 19/186* (2014.11); *G06V 10/751* (2022.01); *H04N 19/119* (2014.11); *H04N 19/132* (2014.11); *H04N 19/176* (2014.11)

(58) Field of Classification Search
None
See application file for complete search history.

(56) References Cited

U.S. PATENT DOCUMENTS

2020/0154115 A1 5/2020 Ramasubramonian et al.
2020/0195930 A1* 6/2020 Choi .................... H04N 19/159
(Continued)

FOREIGN PATENT DOCUMENTS

JP 2013-090015 A 5/2013
KR 2019-0094467 A 8/2019
KR 2021-0073597 A 6/2021

OTHER PUBLICATIONS

International Search Report and Written Opinion for Int. App. No. PCT/KR2023/005951, mailed Aug. 25, 2023.

*Primary Examiner* — Nam D Pham
(74) *Attorney, Agent, or Firm* — MCDONNELL BOEHNEN HULBERT & BERGHOFF LLP

(57) ABSTRACT

A method is disclosed for selecting a reference sample for deriving a cross-component relation model in intra prediction. In the disclosed embodiments, a video decoding device derives temporary sampling positions from neighboring
(Continued)

samples of the current block by using characteristics of a reconstructed luma component or neighboring samples of the current block. The video decoding device evaluates and adjusts the temporary sampling positions to select final positions and derives the cross-component relation model by using samples of the final positions. The video decoding device generates chroma prediction values of the chroma component by applying the cross-component relation model to the luma component.

19 Claims, 17 Drawing Sheets

(51) Int. Cl.
*H04N 19/119* (2014.01)
*H04N 19/132* (2014.01)
*H04N 19/176* (2014.01)

(56) References Cited

U.S. PATENT DOCUMENTS

2020/0244956 A1* 7/2020 Lee ........................ H04N 19/52
2021/0168401 A1 6/2021 Park et al.
2022/0078453 A1 3/2022 Tamse et al.
2022/0116591 A1 4/2022 Huo et al.

* cited by examiner

Reconstructed pixel    Temporary sampling position

● Reference sample

• Average of each sample set for deriving relation model

● Average of entire samples for deriving relation model

METHOD AND APPARATUS FOR SELECTING REFERENCE SAMPLE FOR DERIVING CROSS-COMPONENT RELATION MODEL IN INTRA PREDICTION

CROSS REFERENCE TO RELATED APPLICATIONS

The present application is a U.S. National Phase Application pursuant to 35 U.S.C. § 371 of International Application No. PCT/KR2023/005951 filed on May 2, 2023, which claims priority to Korean Patent Application No. 10-2022-0060670 filed on May 18, 2022 and Korean Patent Application No. 10-2023-0055540 filed on Apr. 27, 2023. The entire disclosure contents of these applications are herewith incorporated by reference into the present application.

TECHNICAL FIELD

The present disclosure relates to a method for selecting a reference sample for deriving a cross-component relation model in intra prediction.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Meanwhile, cross-component prediction technology mainly predicts chroma components based on the similarity between a luma component and a chroma component constituting a block. VVC, the latest standard, applies cross-component prediction technology based on a linear model to predict chroma components. For example, a technology is applied to predict a chroma component block from a luma component block for cross-component prediction. However, in existing cross-component prediction techniques, reference samples at preset locations are used based on the sizes of luma component block and chroma component block to derive a linear model. Therefore, an efficient method is needed to derive a cross-component relation model to improve video encoding efficiency and video quality.

DISCLOSURE

Technical Problem

The present disclosure seeks to provide a video coding method and an apparatus for extracting reference samples based on spatial and statistical information of luma components or neighboring samples of a current block in prediction of a current chroma block using a luma-chroma cross-component relation model. The video coding method and the apparatus derive a cross-component relation model by using the extracted reference samples.

Technical Solution

At least one aspect of the present disclosure provides a method of reconstructing a chroma component of a current block, performed by a video decoding device. The method includes deriving temporary sampling positions from neighboring samples of the current block by using characteristics of a reconstructed luma component or neighboring samples of the current block. Here, the current block includes the luma component and the chroma component. The method also includes evaluating and adjusting the temporary sampling positions to select final positions for deriving a cross-component relation model between luma and chroma components. The method also includes deriving the cross-component relation model by using samples of the final positions. The method also includes generating chroma prediction values of the chroma component by applying the cross-component relation model to the luma component.

Another aspect of the present disclosure provides a method of predicting a chroma component of a current block, performed by a video encoding device. The method includes deriving temporary sampling positions from neighboring samples of the current block by using characteristics of a reconstructed luma component or neighboring samples of the current block. Here, the current block includes the luma component and the chroma component. The method also includes evaluating and adjusting the temporary sampling positions to select final positions for deriving a cross-component relation model between luma and chroma components. The method also includes deriving the cross-component relation model by using samples of the final positions. The method also includes generating chroma prediction values of the chroma component by applying the cross-component relation model to the luma component.

Yet another aspect of the present disclosure provides a computer-readable recording medium that stores a bitstream generated by a video encoding method. The video encoding method includes deriving temporary sampling positions from neighboring samples of a current block by using characteristics of a reconstructed luma component or neighboring samples of the current block. Here, the current block includes the luma component and the chroma component. The video encoding method also includes evaluating and adjusting the temporary sampling positions to select final positions for deriving a cross-component relation model between luma and chroma components. The video encoding method also includes deriving the cross-component relation model by using samples of the final positions. The video encoding method also includes generating chroma prediction values of the chroma component by applying the cross-component relation model to the luma component.

Advantageous Effects

As described above, the present disclosure provides a video coding method and an apparatus for extracting reference samples based on spatial and statistical information of luma components or neighboring samples of a current block in prediction of a current chroma block using a luma-chroma cross-component relation model. The video coding method and the apparatus derive a cross-component relation model by using the extracted reference samples. Thus, the video coding method and the apparatus increase video coding efficiency and enhance video quality.

DETAILED DESCRIPTION

Figure 1:
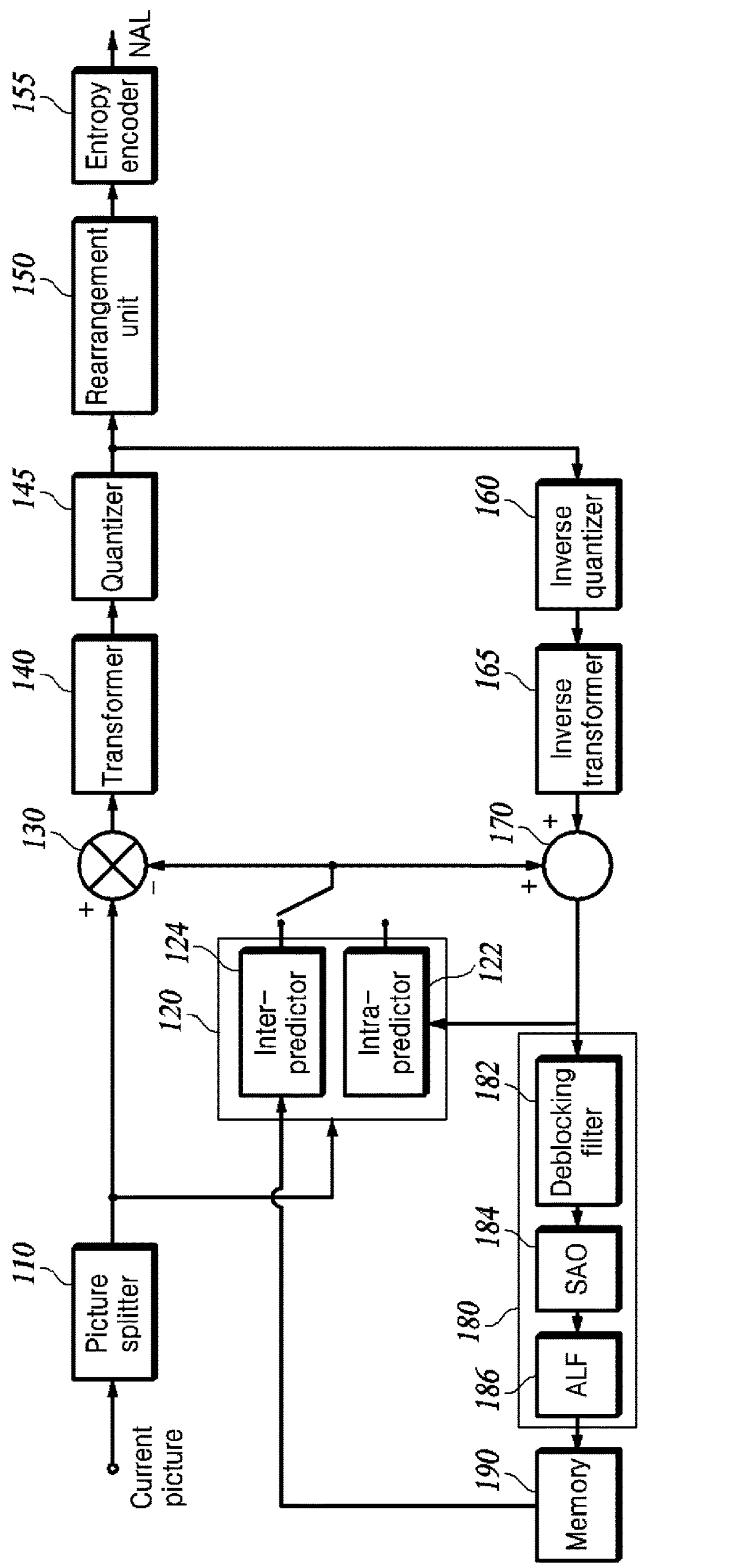
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
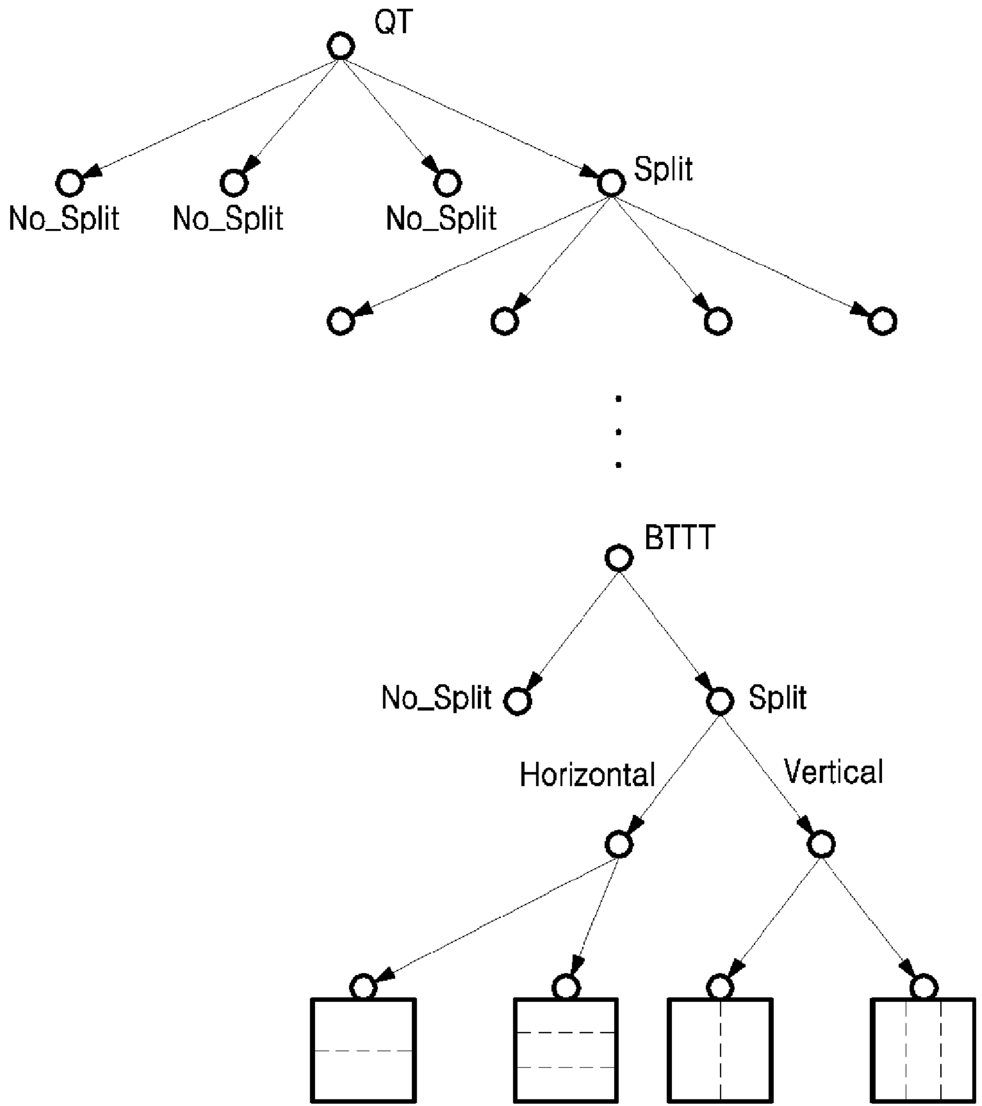
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
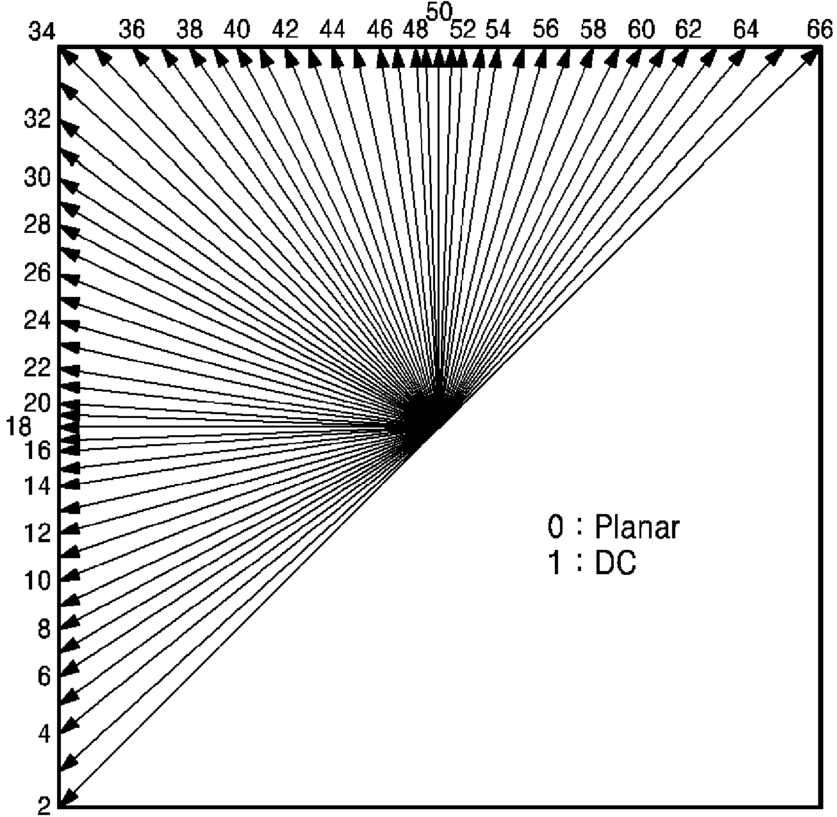
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
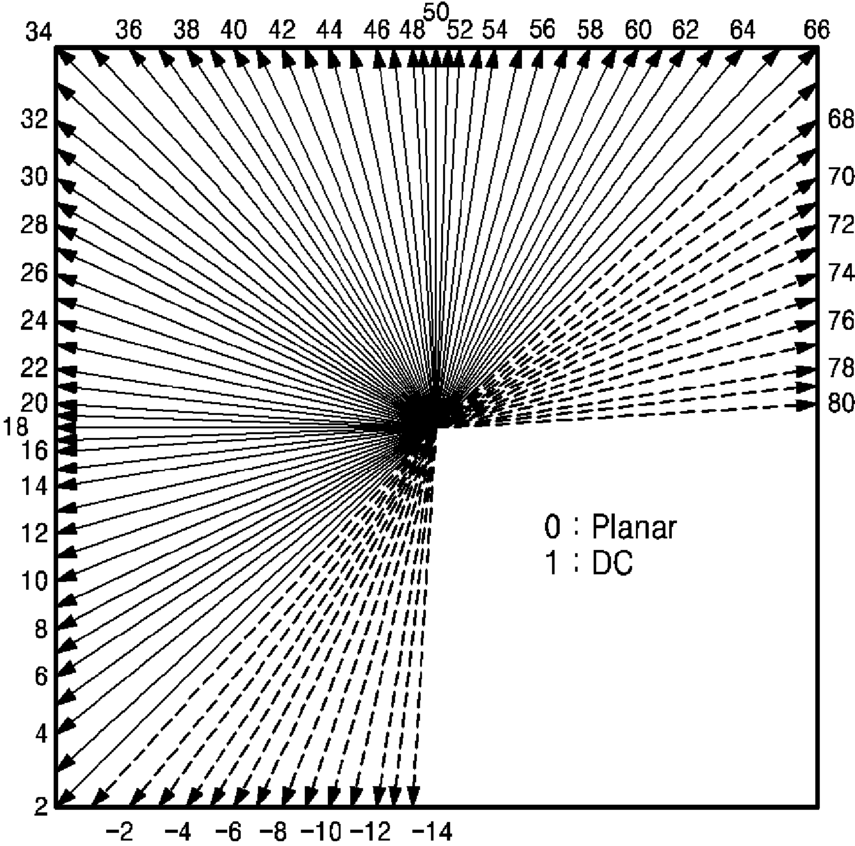

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a “merge candidate”) from the neighboring blocks of the current block.

Figure 4:
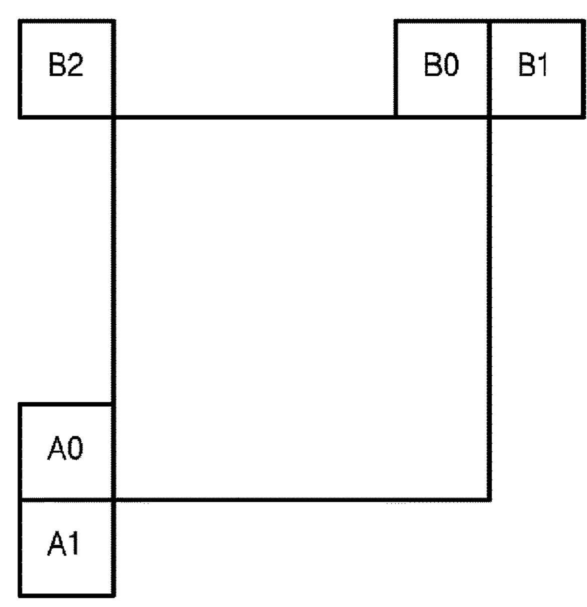
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

The video encoding device may store a bitstream of encoded video data in a non-transitory storage medium or transmit the bitstream to the video decoding device through a communication network.

Figure 5:
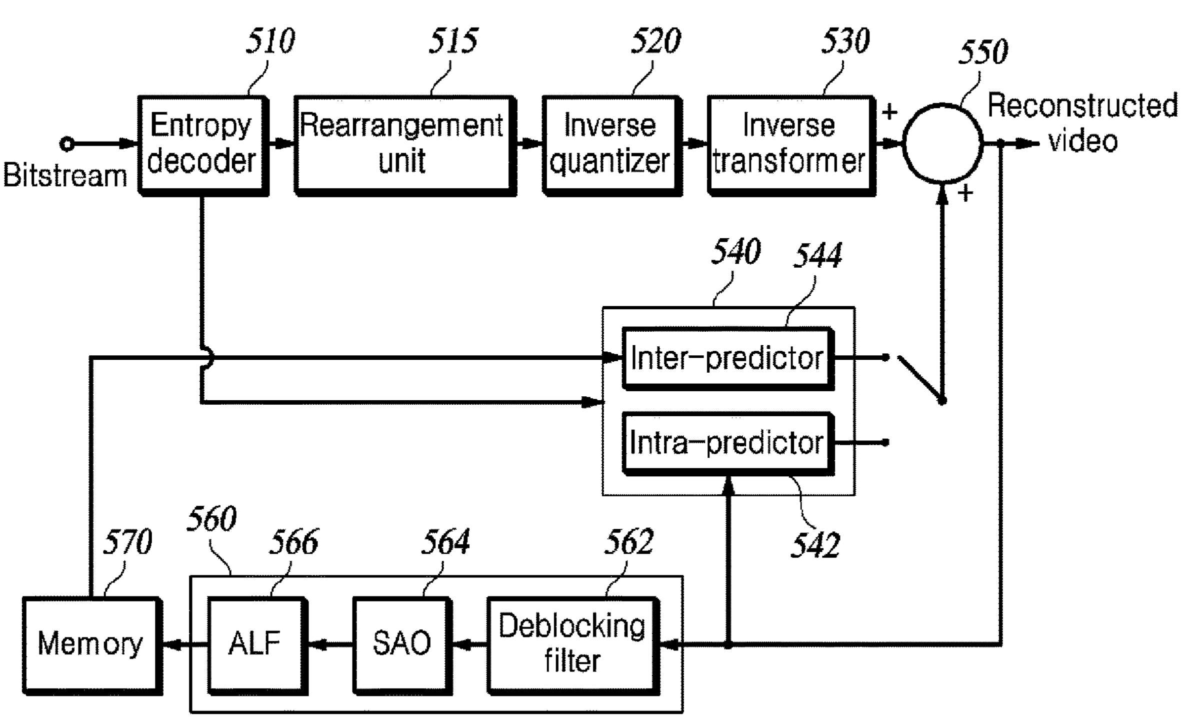
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that extract reference samples according to spatial and statistical information of a luma component or neighboring samples of the current block in the prediction of a current chroma block using a luma-chroma cross-component relation model. The video coding method and the apparatus derive a cross-component relation model by using the extracted reference samples.

The following embodiments may be performed by the intra predictor 122 in the video encoding device. The following embodiments may also be performed by the intra predictor 542 in the video decoding device.

The video encoding device in predicting the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with the prediction of the current block.

In the following description, the term "target block" may be used interchangeably with the current block or coding unit (CU), or may refer to some area of a coding unit.

Further, the value of one flag being true indicates when the flag is set to 1. Additionally, the value of one flag being false indicates when the flag is set to 0.

The following embodiments are described based on the video decoding device but may also be performed by the video encoding device as described above.

Hereinafter, the current block includes a luma component and a chroma component. A current block according to a single tree structure includes a current luma block and a current chroma block. Since the current block and the current luma block have the same size, the current block and the current luma block may be used interchangeably in the description according to the present disclosure. Meanwhile, the current block according to a dual tree structure may include the current chroma block and a corresponding luma region from the perspective of prediction of the chroma component.

The inverse transformer 530, the intra predictor 542, and the adder 550 in the video decoding device illustrated in FIG. 5 may operate as follows in relation to luma-chroma cross-component prediction. First, the inverse transformer 530 generates luma and chroma residual blocks, and the intra predictor 542 generates a luma prediction block. The adder 550 adds the luma residual block and the prediction block to generate a luma restoration block. Thereafter, the intra predictor 542 may generate a chroma prediction block using the luma restoration block, and the adder 550 may generate a chroma restoration block by adding the chroma prediction block and the chroma residual block.

The present embodiment deals with the process of predicting the corresponding chroma component by using the reconstructed luma component. In other words, the chroma component prediction based on the luma-chroma cross-component relation model is described. In deriving the cross-component relation model between the luma component and the chroma component, the intra predictor 542 may select the optimal samples for deriving the cross-component relation by using the luma component characteristics of the current block and the statistical characteristics of the neighboring samples.

Figure 6:
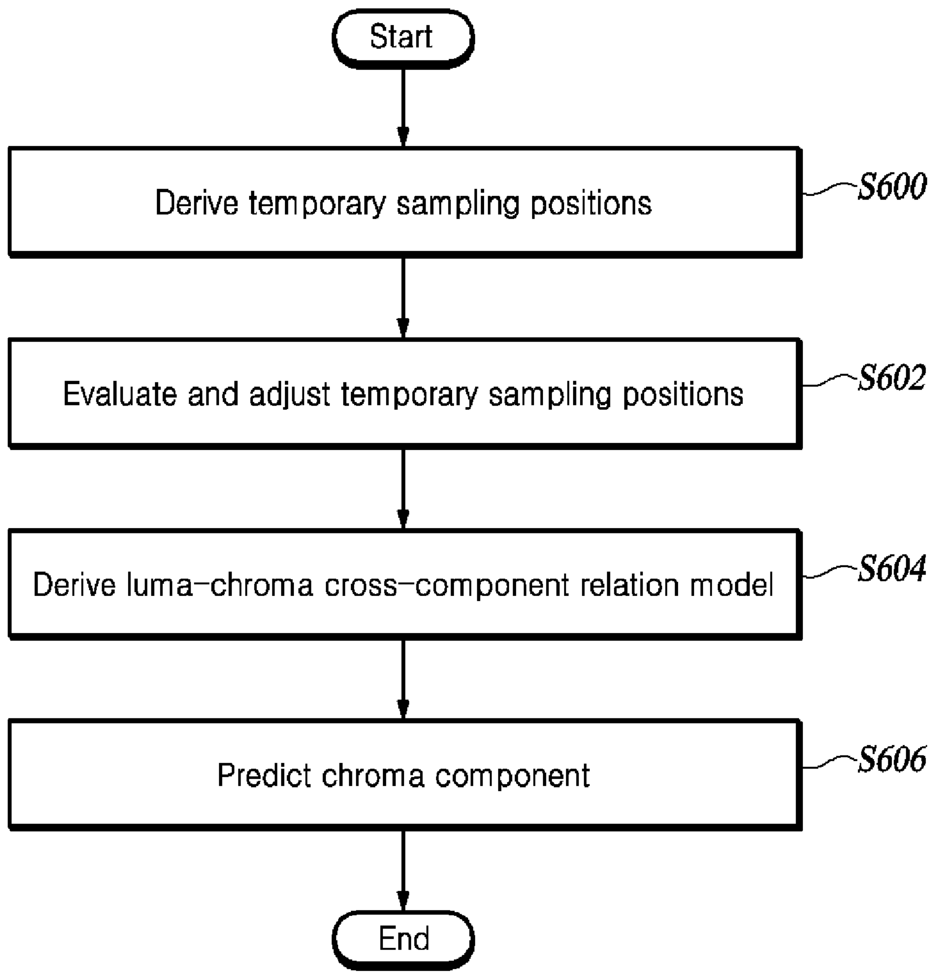
FIG. 6 is a flowchart illustrating a cross-component prediction method for a chroma component performed by a video decoding device according to an embodiment of the present disclosure.

FIG. 6 is a flowchart illustrating a cross-component prediction method for a chroma component performed by the video decoding device according to an embodiment of the present disclosure.

The video decoding device derives temporary sampling positions from the neighboring samples of the current block by using the characteristics of the reconstructed luma component or neighboring samples of the current block (S600).

The video decoding device may derive N temporary sampling positions from the luma and chroma neighboring samples. At this time, N depends on the size of the current block and may be determined in advance according to an agreement between the video encoding device and the video decoding device.

Since the luma component is reconstructed first, the intra predictor 542 first derives temporary sampling positions of the luma component. Thereafter, the intra predictor 542 may derive temporary sampling positions of the chroma component by using the temporary sampling positions of the luma component.

The video decoding device evaluates and adjusts the temporary sampling positions (S602).

The video decoding device evaluates the appropriateness of the temporary sampling positions by using the temporary sampling positions and the statistical properties of the neighboring samples at the temporary sampling positions. Depending on the evaluation result, the video decoding device may use only some of the temporary sampling positions or adjust some of the positions. Finally, the video decoding device may select positions for deriving the cross-component relation model.

The video decoding device derives the luma-chroma cross-component relation model (S604). The video decoding device may derive the luma-chroma cross-component relation model by using the samples of the finally selected positions.

The video decoding device predict the chroma component of the current block by applying the cross-component relation model to the reconstructed luma component to (S606).

The chroma component prediction based on the luma-chroma cross-component relation model may be performed in units of a current chroma block, a luma block corresponding to the current chroma block (hereinafter, 'corresponding luma block' or 'current luma block'), a luma region corresponding to the current chroma block (hereinafter, 'corresponding luma region'), a current chroma subblock, a luma subblock corresponding to the current chroma subblock (hereinafter, 'corresponding luma subblock' or 'current luma subblock'), or a luma subregion corresponding to the current chroma subblock (hereinafter, 'corresponding luma subregion'). Accordingly, the chroma component of the current block may be the current chroma block or the current chroma subblock. In addition, the luma component of the current block may be the corresponding luma block, the corresponding luma region, the corresponding luma subblock, or the corresponding luma subregion. Meanwhile, the corresponding luma block and the current luma block may be used interchangeably.

Meanwhile, the flowchart illustrated in FIG. 6 may be performed by the intra predictor 542 in the video decoding device. In addition, the intra predictor 122 in the video encoding device may also perform the flowchart illustrated in FIG. 6.

In addition, the video encoding device may signal a 1-bit flag (hereinafter referred to as 'cross-component prediction flag') to the video decoding device to indicate whether to use chroma component prediction based on the luma-chroma cross-component relation model. For example, if the cross-component prediction flag is true, the intra predictor 542 performs cross-component prediction on the current chroma block. Meanwhile, if the cross-component prediction flag is false, the intra predictor 542 may perform intra prediction using reference samples of the current chroma block.

Hereinafter, an operation of deriving a temporary sampling position is described in detail.

As described above, the intra predictor 542 may derive positions for sampling the neighboring luma component or neighboring chroma component based on the characteristics of the current block or neighboring samples. The derived temporary sampling positions may be a point in the region in which the reference samples exist and may be integer pels or subpels. In the case of subpels, a corresponding pixel value may be extracted using interpolation or a predefined filter.

The positions for sampling the neighboring samples of the corresponding luma block bawed on the characteristics of the luma component of the current block may be derived as in the following example.

Figure 7A:
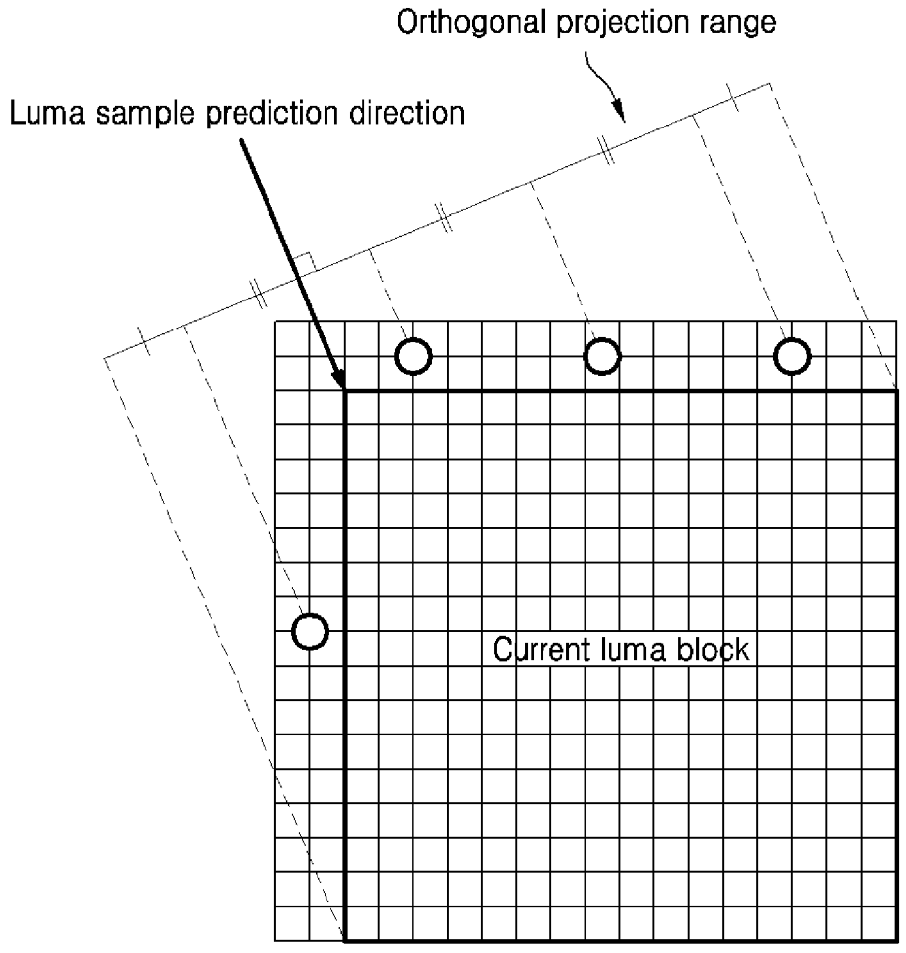
FIGS. 7A, 7B, and 7C are diagrams illustrating temporary sampling positions based on a directional mode according to an embodiment of the present disclosure.
Figure 7B:
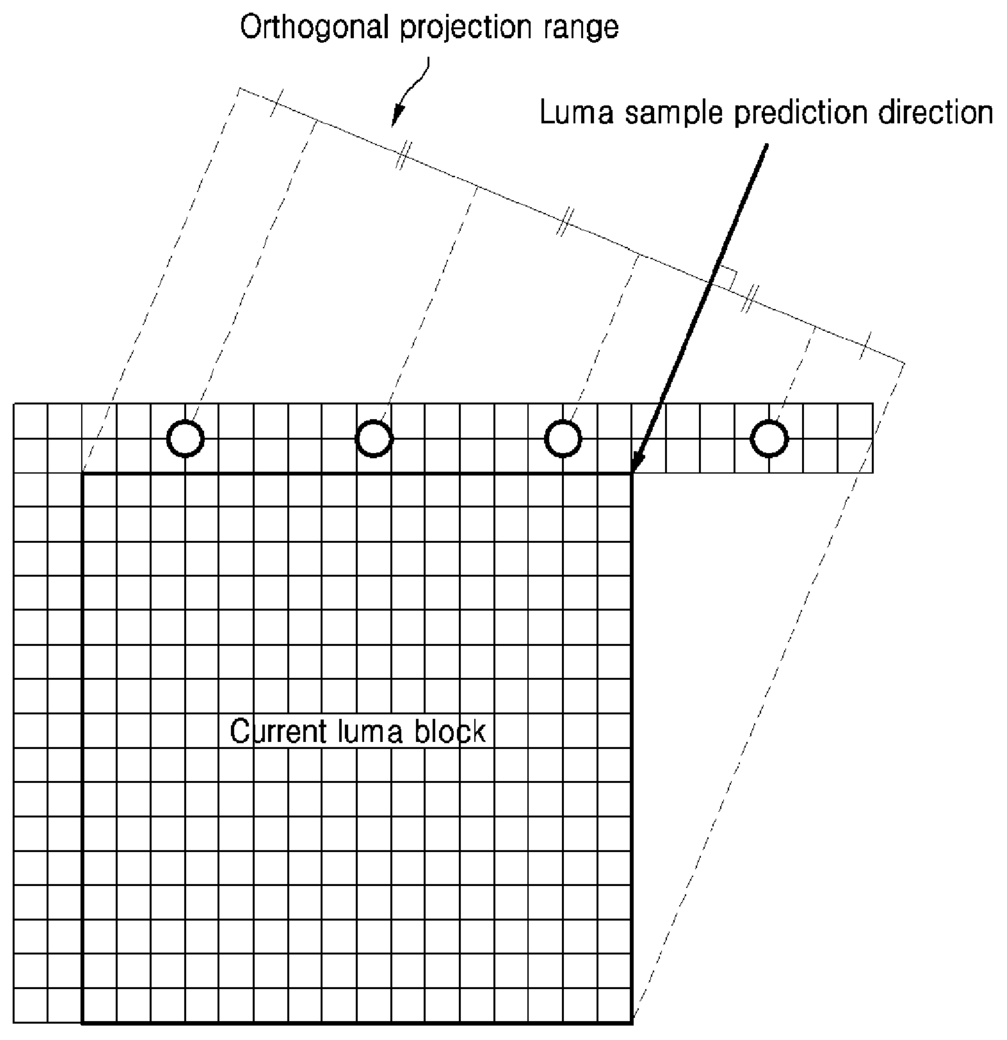
Figure 7C:
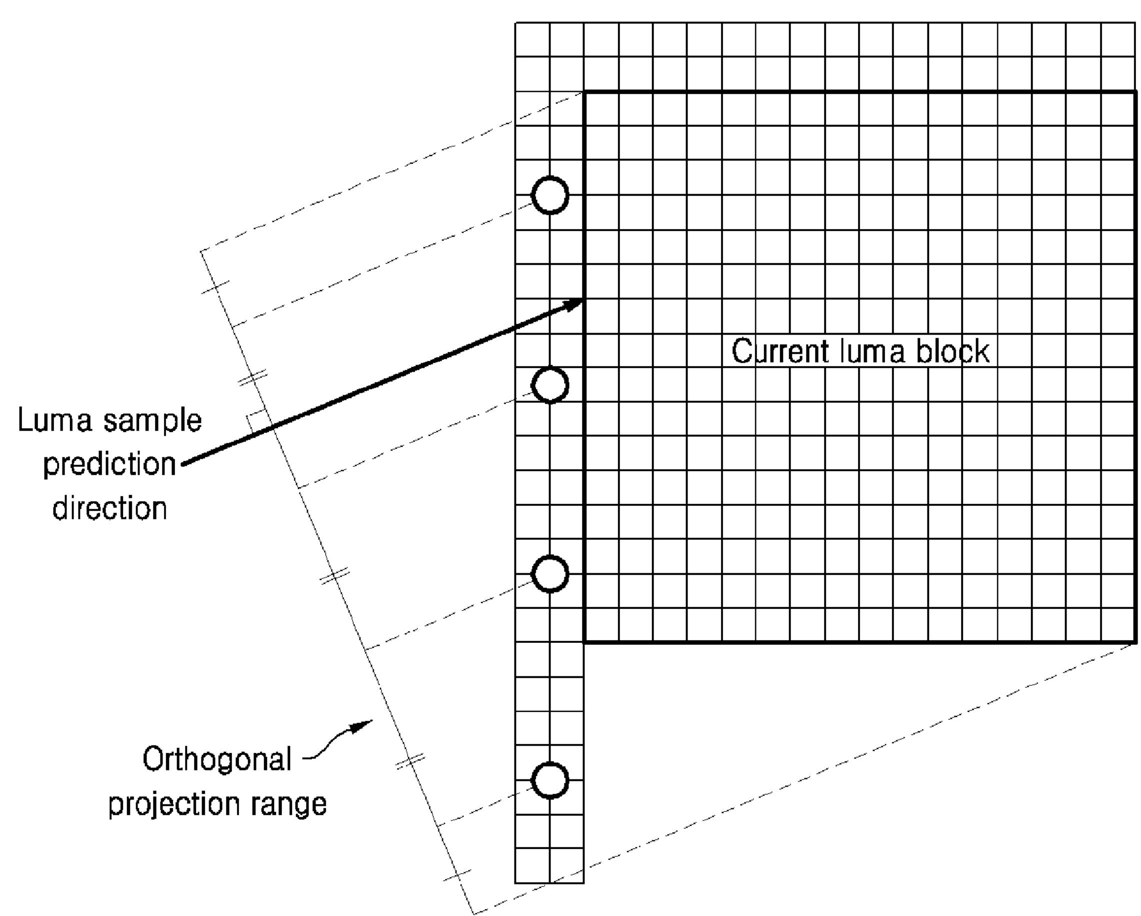

FIGS. 7A to 7C are diagrams illustrating temporary sampling positions based on a directional mode according to an embodiment of the present disclosure.

As an example, as in the examples of FIGS. 7A to 7C, when a luma component prediction mode of the current block is a directional mode, the intra predictor 542 may acquire an orthogonal projection range in which the current block (i.e., the corresponding luma block) is orthogonally projected onto a straight line perpendicular to the prediction direction. The intra predictor 542 may derive the positions of reference samples that are projected at points that divide the projection range evenly as temporary sampling positions according to the following example.

Figure 8:
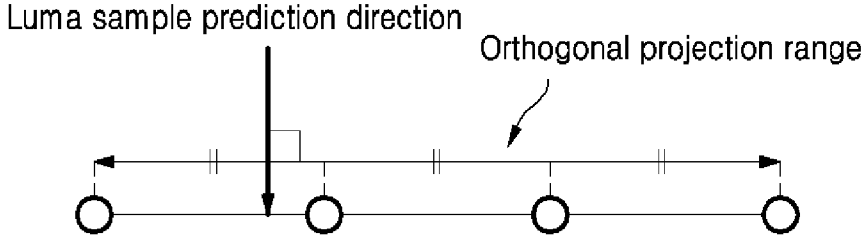
FIG. 8 is a diagram illustrating temporary sampling positions according to an embodiment of the present disclosure.

FIG. 8 is a diagram illustrating temporary sampling positions according to an embodiment of the present disclosure.

For example, as in the example of FIG. 8, the intra predictor 542 may divide the orthogonal projection range into N−1 sections (here, N is a positive integer of 2 or greater) having the same width and then determine N points corresponding to the boundaries of the sections as temporary sampling positions.

Figure 9A:
FIGS. 9A and 9B are diagrams illustrating temporary sampling positions according to another embodiment of the present disclosure.
Figure 9A:
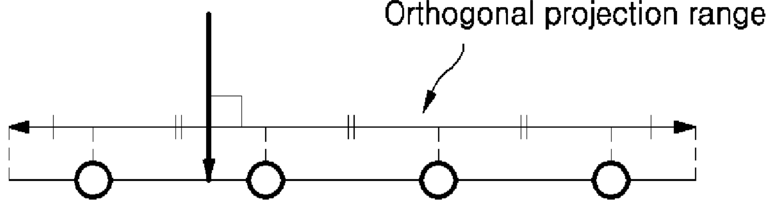

Alternatively, as in the example of FIG. 9A, the intra predictor 542 may divide the orthogonal projection range into N+1 sections with a constant width and set the widths of the sections located at both ends to half of the widths of the other sections. The intra predictor 542 determines N points located at the boundaries of the sections as temporary sampling positions but does not include both ends of the orthogonal projection range in the sampling positions. Meanwhile, in the examples of FIG. 7A to FIG. 7C, temporary sampling positions according to the example of FIG. 9*a* are used.

Figure 9B:
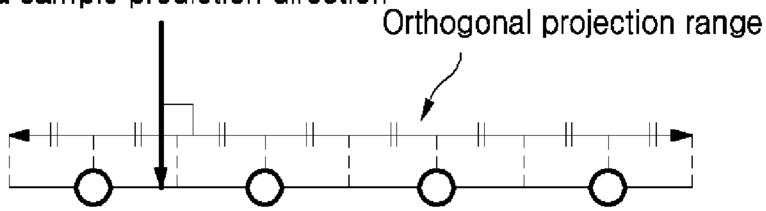

Meanwhile, the example of FIG. 9A may be expressed like the example of FIG. 9B.

As in the example of FIG. 9B, the intra predictor 542 may divide the orthogonal projection range into N sections having the same width and then determine N points located at the center of the sections as temporary sampling positions.

The example of FIG. 9B may also be expressed as follows. In other words, the intra predictor 542 may divide the orthogonal projection range into 2N sections having the same width and then determine N points located at the boundaries of the odd-numbered sections and the even-numbered sections as temporary sampling positions.

Figure 10A:
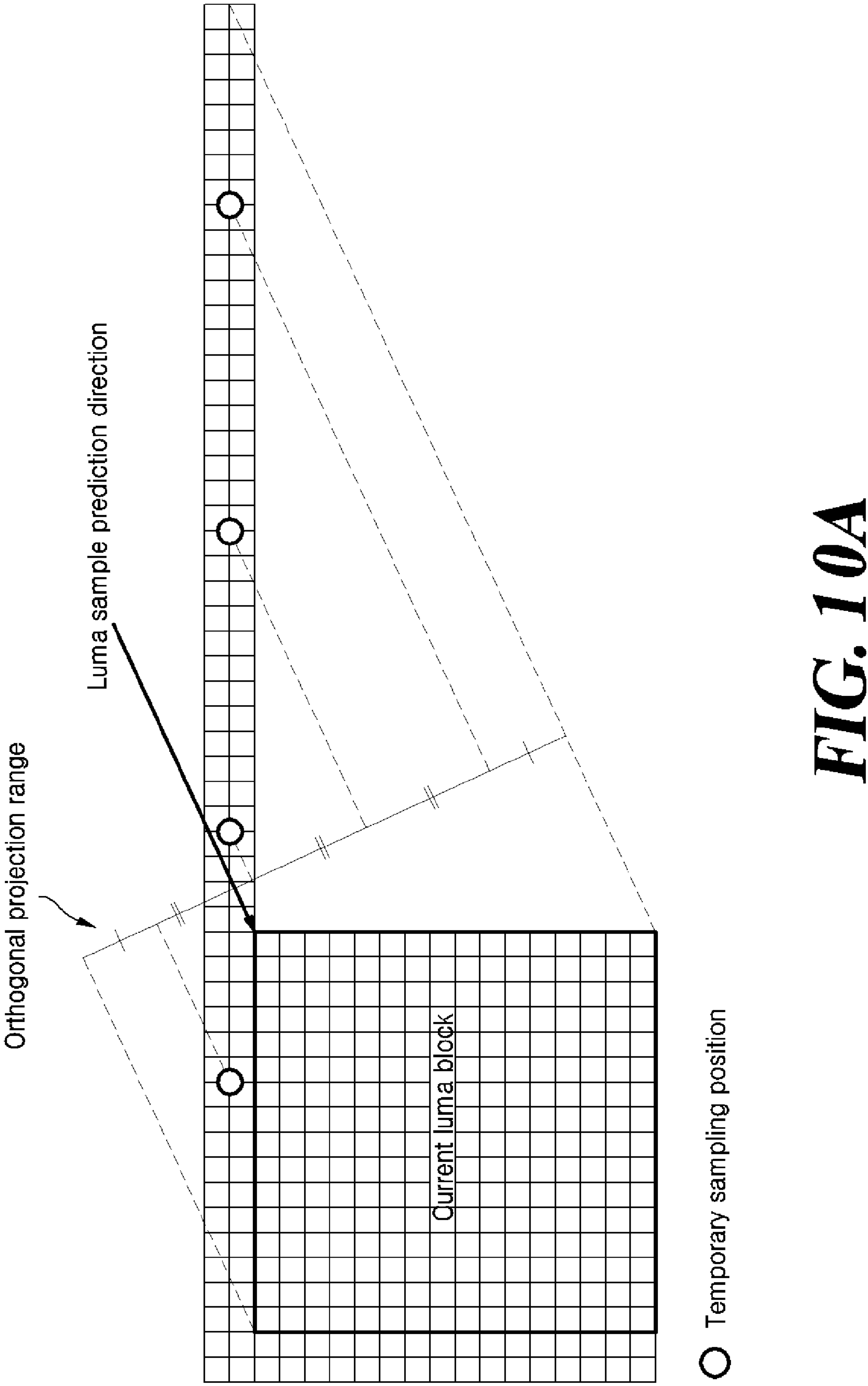
FIGS. 10A and 10B are diagrams illustrating temporary sampling positions based on an adjusted orthogonal projection range according to an embodiment of the present disclosure.
Figure 10B:
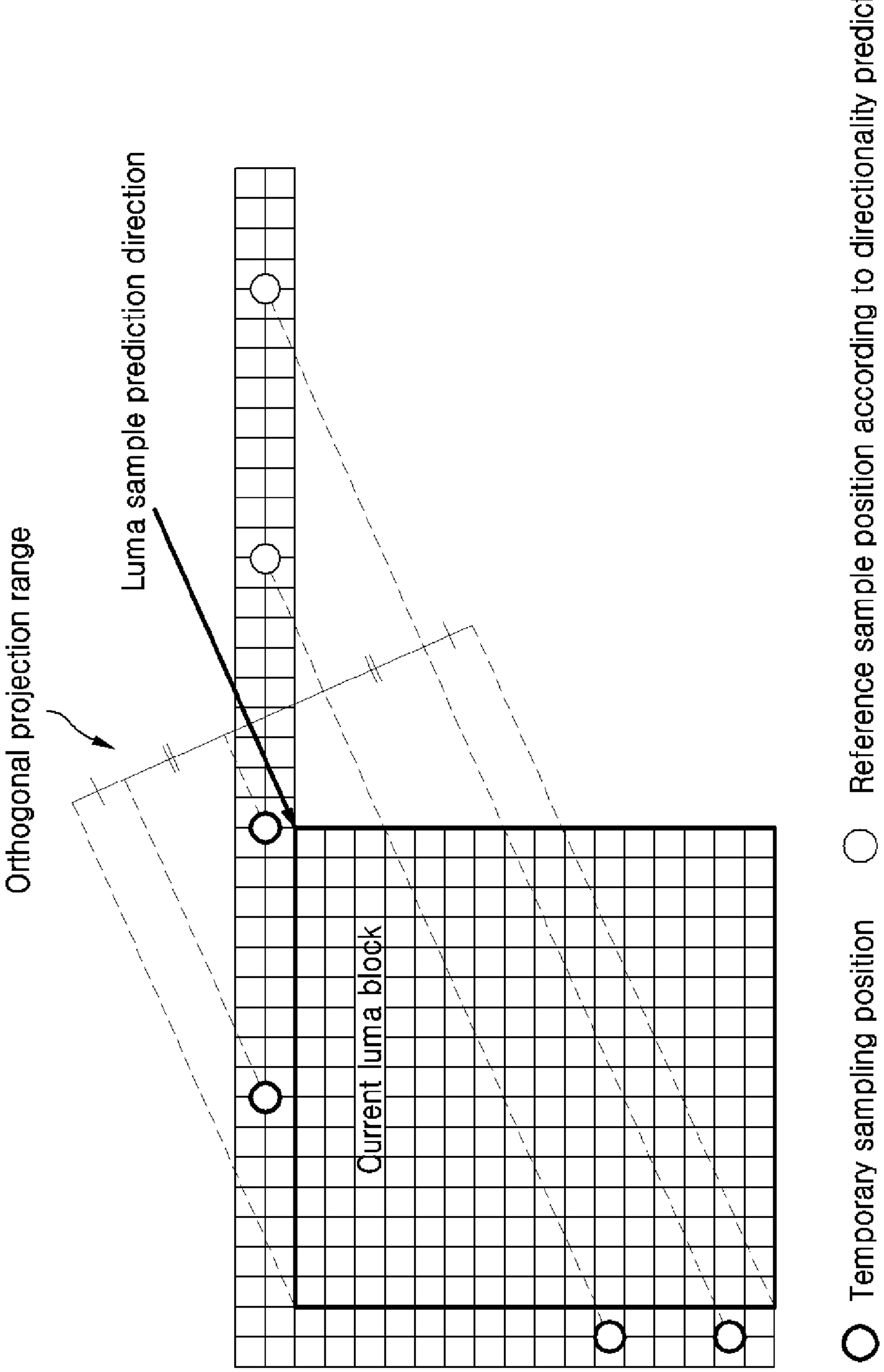

FIG. 10A and FIG. 10B are diagrams illustrating temporary sampling positions based on the adjusted orthogonal projection range according to an embodiment of the present disclosure.

Meanwhile, if the prediction direction of the corresponding luma block of the current chroma block is less than 45° or greater than 225°, the intra predictor 542 may select a reference sample closer to the current block (i.e., the corresponding luma block) as a temporary sampling position instead of the reference sample that may be used in the actual directionality prediction. As in the example of FIG. 10A, if the prediction direction of the luma component is less than 45°, the top reference samples used according to the actual prediction direction may be located too far away. The intra predictor 542 adjusts the projection range so that the top and left reference samples adjacent to the current block may be used, as in the example of FIG. 10B. The intra predictor 542 may determine temporary sampling positions for the adjusted projection range, as in the example of FIG. 8 or FIG. 9B. At this time, the intra predictor 542 may include left reference samples closer to the current block in the temporary sampling positions, as in the example of FIG. 10B.

Figure 11:
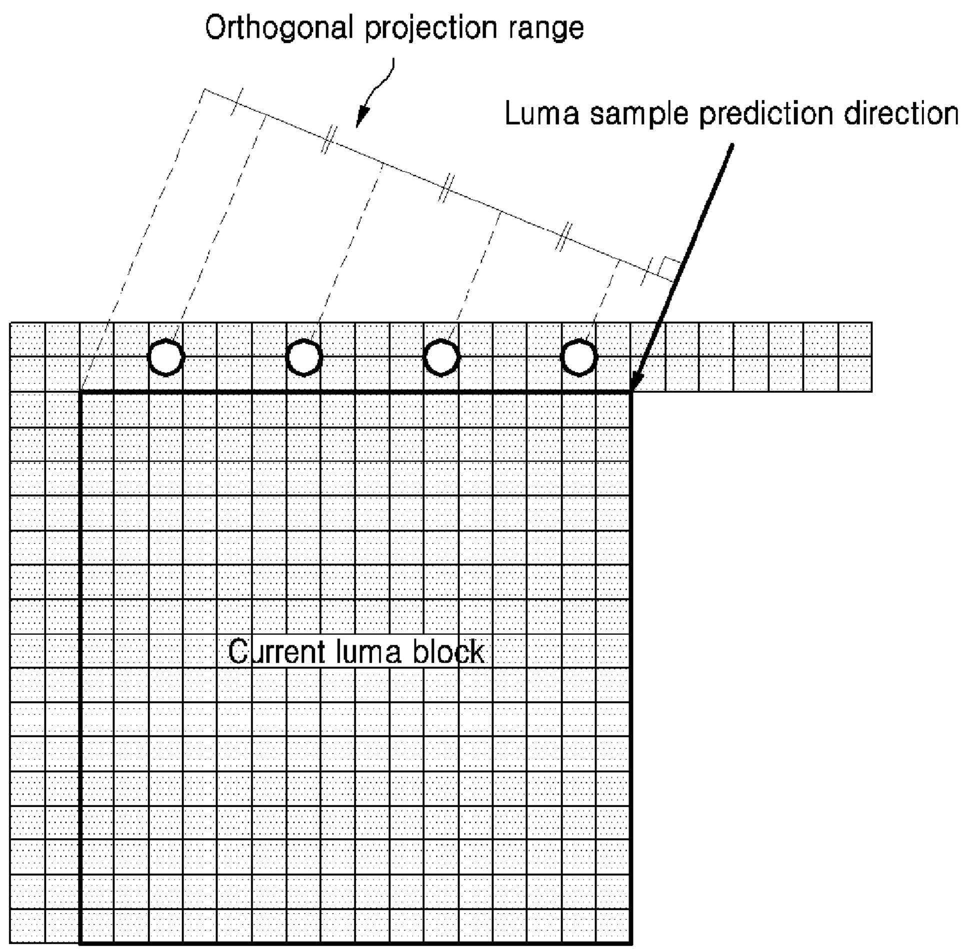
FIG. 11 is a diagram illustrating temporary sampling positions based on an adjusted orthogonal projection range according to another embodiment of the present disclosure.
Figure 11:
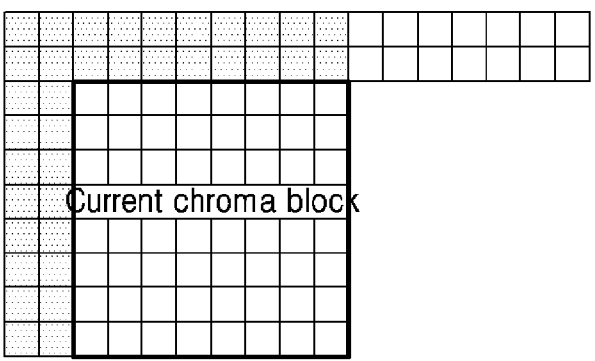

FIG. 11 is a diagram illustrating temporary sampling positions based on an adjusted orthogonal projection range according to another embodiment of the present disclosure.

In addition, if there is no chroma reference sample corresponding to the temporary sampling position selected according to a prediction direction of the luma block as in the example of FIG. 11, the intra predictor 542 may determine temporary sampling positions only in the luma reference sample region corresponding to the region in which the chroma reference samples exist. As in the example of FIG.

11, the intra predictor 542 may adjust the orthogonal projection range to be suitable for the luma reference sample region corresponding to the region in which the chroma reference sample exists. The intra predictor 542 may determine temporary sampling positions for the adjusted orthogonal projection range as in the example of FIG. 8 or FIG. 9B.

As an example, if the luma component prediction mode of the current block is a non-directional mode, such as DC or planar mode, the intra predictor 542 may derive temporary sampling positions by assuming that the luma component prediction mode has an arbitrary prediction direction. At this time, the arbitrary direction may be a preset value or determined according to the size or aspect ratio of the block.

Figure 12:
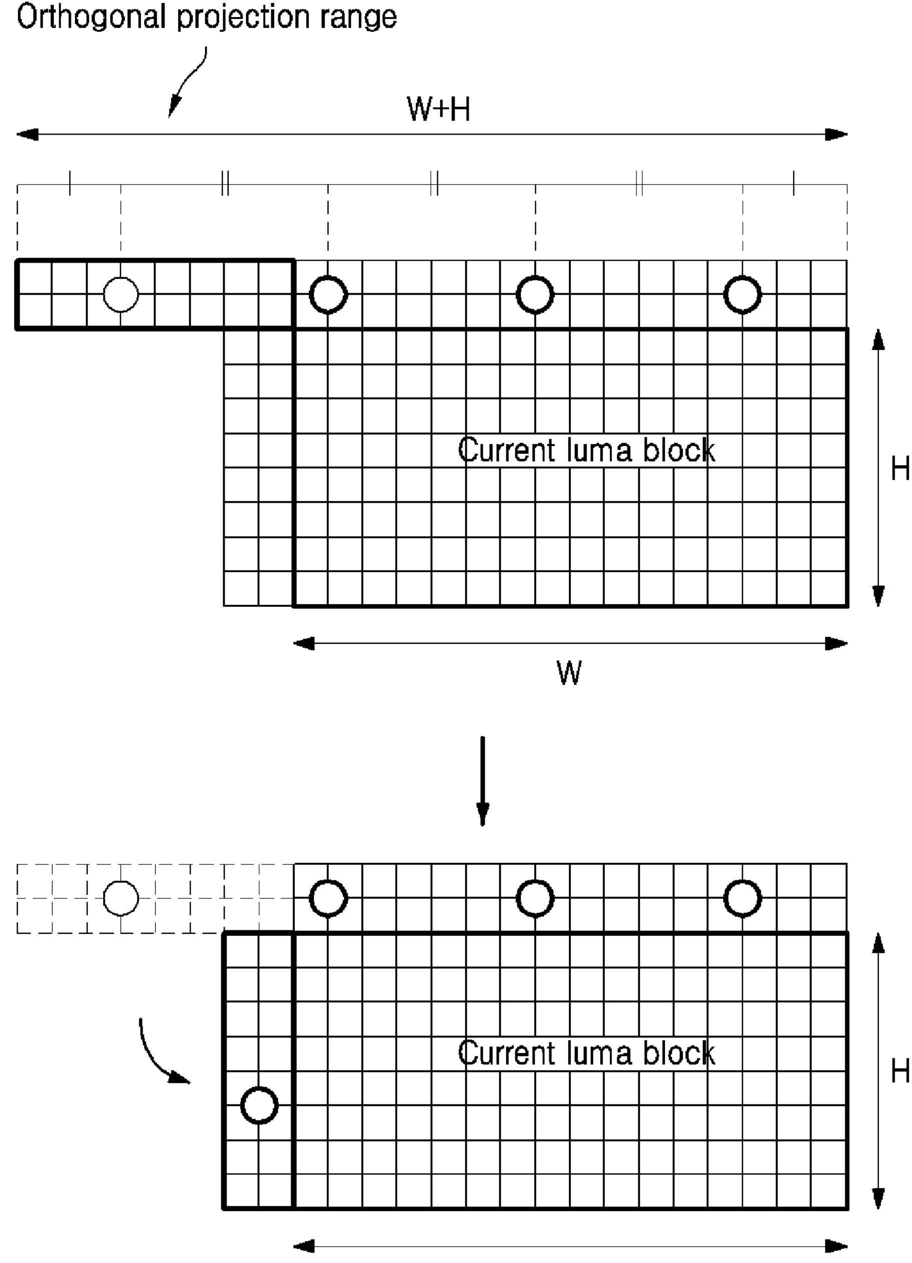
FIG. 12 is a diagram illustrating orthogonal projection range and temporary sampling positions based on a non-directional mode according to an embodiment of the present disclosure.

FIG. 12 is a diagram illustrating an orthogonal projection range and temporary sampling positions based on a non-directional mode according to an embodiment of the present disclosure.

For example, if the luma component prediction mode of the current block is the non-directional mode, the temporary sampling positions may be determined according to the size of the current block. As in the example of FIG. 12, if the height of the current block (i.e., the corresponding luma block) is H and the width is W, the region of the top reference sample having a width of (W+H) may be set as the above-described orthogonal projection range. The intra predictor 542 may derive the temporary sampling positions by dividing the orthogonal projection range evenly and arranging the sampling position(s) that are not adjacent to the current block on the left side of the block according to the following embodiment.

First, as in the example of FIG. 8, the intra predictor 542 may divide the orthogonal projection range into N−1 sections having the same width and then determine N points located on the boundaries of the sections as temporary sampling positions.

Alternatively, as in the example of FIG. 9B, the intra predictor 542 may divide the orthogonal projection range into N sections having the same width and then determine N points located at the center of the sections as temporary sampling positions.

As an example, a case in which two or more cross-component relation models are used to predict the chroma component of the current block is described.

Figure 13:
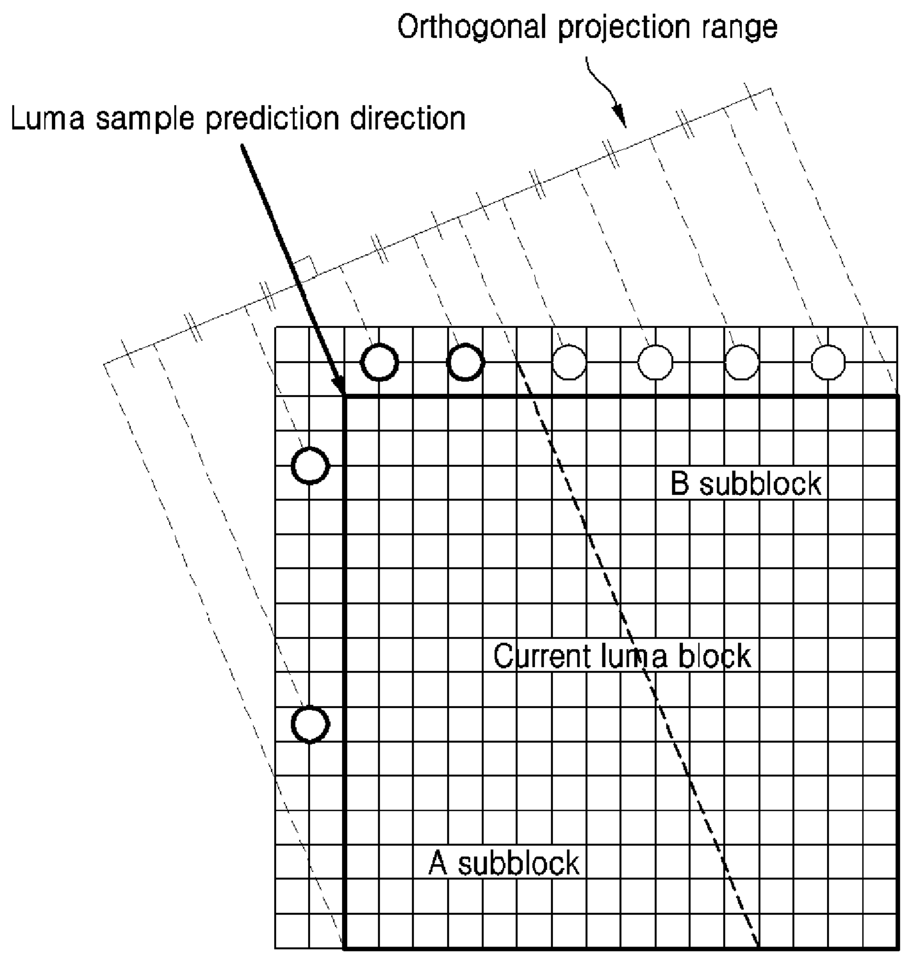
FIG. 13 is a diagram illustrating temporary sampling positions for each subblock according to an embodiment of the present disclosure.

FIG. 13 is a diagram illustrating temporary sampling positions for each subblock according to an embodiment of the present disclosure.

Whether to use two or more cross-component relation models may be determined based on flag signaling, a result of detecting an edge component of a reconstructed luma block, or discontinuity of the reference sample. When M (here, M is a positive integer of 2 or greater) cross-component relation models are used, the intra predictor 542 may determine a subblock division structure and temporary sampling positions based on the luma component characteristics of the current block, the characteristics of the luma reference sample, or the characteristics of the chroma reference sample according to the following example.

First, as in the example of FIG. 13, temporary sampling positions may be determined using the reconstructed luma component. The intra predictor 542 may detect an edge included in the reconstructed current luma block and divide the current block (i.e., the corresponding luma block) into M subblocks based on the detected edge. The intra predictor 542 may divide the reference samples into M regions based on the boundaries of the divided subblocks or the positions in which the edges and the reference samples meet.

Alternatively, the reference samples may be divided into M regions based on the discontinuity of the luma reference samples or chroma reference samples of the current block. For example, if a difference between adjacent reference samples is greater than a preset threshold value, the intra predictor 542 may determine the difference between the adjacent reference samples as a boundary between the divided regions. At this time, the threshold value may be implicitly determined from a brightness distribution of the neighboring samples. Alternatively, the threshold value may be a preset value. The current block may be divided into M subblocks by a straight line including the boundary of the region of the divided reference samples and parallel to the prediction direction of the luma component.

Meanwhile, the intra predictor 542 may perform cross-component prediction on the subblocks similarly to the order illustrated in FIG. 6. In other words, the intra predictor 542 may determine temporary sampling positions for the subblocks according to the partition structure of the current block or the reference sample region and the prediction mode of the luma component. The intra predictor 542 may extract final samples for model derivation from the temporary sampling positions for each subblock and separately derive a cross-component relation model based on the samples of each subblock. The intra predictor 542 may separately predict a chroma component corresponding to each subblock by using the cross-component relation model derived for each subblock. Alternatively, the intra predictor 542 performs chroma component prediction of the entire block for each relation model by using the cross-component relation model of each subblock. Thereafter, the intra predictor 542 may mix the predicted chroma components according to the subblock division structure (e.g., weighted sum) and may use the mixed predicted chroma components as a predicted value of the chroma block.

As an example, a case in which the current chroma block and the corresponding luma block are divided differently, such as a dual tree structure, is described.

Figure 14:
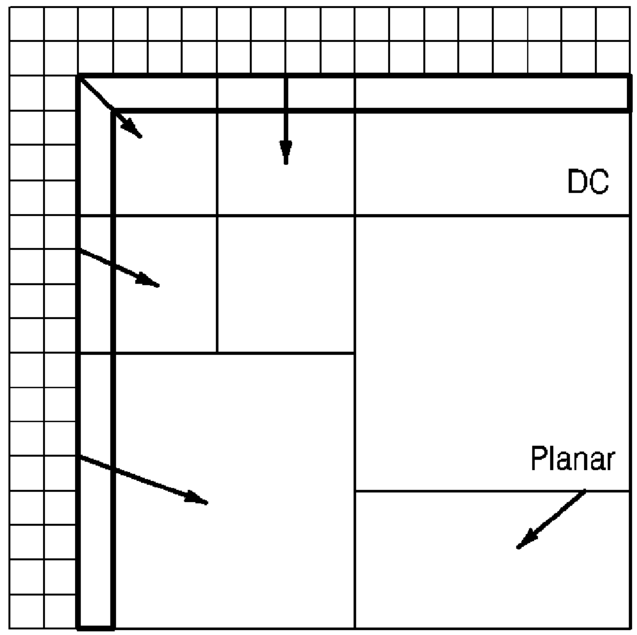
FIG. 14 is a diagram illustrating a corresponding luma region of a current chroma region according to an embodiment of the present disclosure.

FIG. 14 is a diagram illustrating a corresponding luma region of a current chroma region according to an embodiment of the present disclosure.

As in the example of FIG. 14, the intra predictor 542 may determine temporary sampling positions according to a prediction mode of a region adjacent to the reference samples in the corresponding luma region of the current chroma block to be predicted, as in the following embodiment.

For example, the intra predictor 542 may count a prediction direction used in the region adjacent to the reference samples in the corresponding luma region and determine the most used prediction direction as a representative direction of the corresponding luma region. Thereafter, the intra predictor 542 may determine the temporary sampling positions of the corresponding luma region as described above based on the representative direction.

Alternatively, the intra predictor 542 may average the prediction directions used in the region adjacent to the reference samples in the corresponding luma region and determine an average direction as a representative direction of the corresponding luma region. Thereafter, the intra predictor 542 may determine the temporary sampling positions of the corresponding luma region as described above based on the representative direction.

Alternatively, if the prediction directions between adjacent blocks within the regions adjacent to the reference samples in the corresponding luma region differ by a threshold angle or greater, the intra predictor 542 may divide the corresponding luma region into M corresponding luma subregions based on the boundary between the adjacent blocks. The threshold angle may be determined according to the size, aspect ratio, or prediction direction of the adjacent blocks. Alternatively, the threshold angle may be a preset angle. As described above, different cross-component relation models may be derived for different corresponding luma subregions.

As an example, the temporary sampling positions according to the characteristics of the luma component may be expressed by a lookup table according to a prior agreement between the video encoding device and the video decoding device. Here, the lookup table may include temporary sampling positions determined according to the prediction mode of the luma component, the block size, and the aspect ratio that are optimized and defined in advance in the video encoding device and the video decoding device.

Meanwhile, the temporary sampling positions of the chroma component corresponding to the temporary sampling positions of the luma component may be determined based on a chroma subsampling format of the chroma component as in the following example.

As an example, if the current image is subsampled in a YUV 4:4:4 format, the temporary sampling positions of the chroma component may be the same as the temporary sampling positions of the luma component.

In addition, if the current image is subsampled in a YUV 4:2:0 format, for the temporary sampling positions (XL, YL) of the luma component, the temporary sampling positions of the chroma component may be ((XL+1)>>1, (YL+1)>>1).

Hereinafter, the operation of evaluating and adjusting the temporary sampling positions is described in detail.

The intra predictor 542 evaluates the selected temporary sampling positions by using the luma and chroma temporary sampling position, and the neighboring samples of the temporary sampling positions, as in the following embodiment. Depending on the evaluation result, the intra predictor 542 may use only some of the selected temporary sampling positions or adjust some positions.

Figure 15:
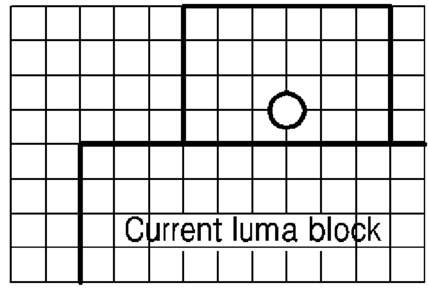
FIG. 15 is a diagram illustrating an evaluation block of a temporary sampling position according to an embodiment of the present disclosure.

FIG. 15 is a diagram illustrating an evaluation block of a temporary sampling position according to an embodiment of the present disclosure.

As an example, if a difference between an average pixel value of pixels included in an evaluation block such as the example of FIG. 15 and a pixel value of the temporary sampling position included in the evaluation block is greater than a threshold value, the intra predictor 542 may not use the corresponding temporary sampling position in the derivation of the cross-component relation model. Alternatively, the corresponding position may be adjusted as in the following embodiment. Here, the evaluation block may include a single temporary sampling position and may have a fixed size. Alternatively, the evaluation block may have a size determined according to the size, aspect ratio, or prediction direction of the luma block. In addition, the threshold value may be determined according to the distribution of pixel values in the luma block or evaluation block or may be a preset value.

For example, the temporary sampling position may be adjusted based on the evaluation result described above. If the temporary sampling position to be adjusted exists at the top of the current block, the intra predictor 542 may adjust the sampling position by L pixels (here, L is a positive integer of 1 or greater) in the left or right direction. If the temporary sampling position to be adjusted exists at the left of the current block, the intra predictor 542 may adjust the sampling position by L pixels in the top or bottom direction. The direction of the sampling position adjustment (left or right or up and down) may be a direction agreed upon in advance between the video encoding device and the video decoding device or may be determined according to the characteristics of the neighboring reference samples. The size L of the sampling position adjustment may be determined based on the size of the current block or the amount of brightness change of the sampling position. The intra predictor 542 may repeatedly perform the sampling position adjustment and evaluation until the difference between the average pixel value of the pixels included in the evaluation block and the temporary sampling position pixel value is smaller than the threshold value.

Finally, the intra predictor 542 may evaluate and adjust the temporary sampling positions to determine K (where K is a positive integer of 2 or greater) luma-chroma sample pairs for model derivation.

Hereinafter, the operation of deriving a luma-chroma cross-component relation model is described in detail.

The intra predictor 542 may derive parameters expressing the luma-chroma cross-component relation model in units of luma blocks, chroma blocks, or subblocks by using the finally determined K luma-chroma sample pairs.

As an example, after the K final luma-chroma sample pairs are sorted in descending order based on the pixels of the luma component or chroma component, the sample pairs from first to (K>>1)-th are defined as a set $S_a$ and the sample pairs from ((K+1>>1)+1)-th to K-th are defined as a set $S_b$. The average of the luma component and chroma component of the sample pairs included in $S_a$ are defined as $X_a$ and $Y_a$, respectively, and the average of the luma component and chroma component of the sample pairs included in $S_b$ are defined as $X_b$ and $Y_b$, respectively. Parameters α and β, which represent a cross-component linear relation using the two average luma-chroma sample pairs may be expressed as in Equation 1.

$$\alpha = \frac{Y_a - Y_b}{X_a - X_b},\quad \beta = Y_b - \alpha \cdot X_b \qquad \text{[Equation 1]}$$

As an example, the video decoding device may parse the flag indicating whether to correct the cross-component relation model and then may correct the cross-component relation model if the parsed flag is true. At this time, the parameters for correction may be determined according to the lookup table and index signaling agreed upon in advance between the video encoding device and the video decoding device. If the luma-chroma cross-component linear model is corrected according to the flag, the intra predictor 542 may adjust the values of the parameters α and β of the linear model according to the following example.

Figure 16:
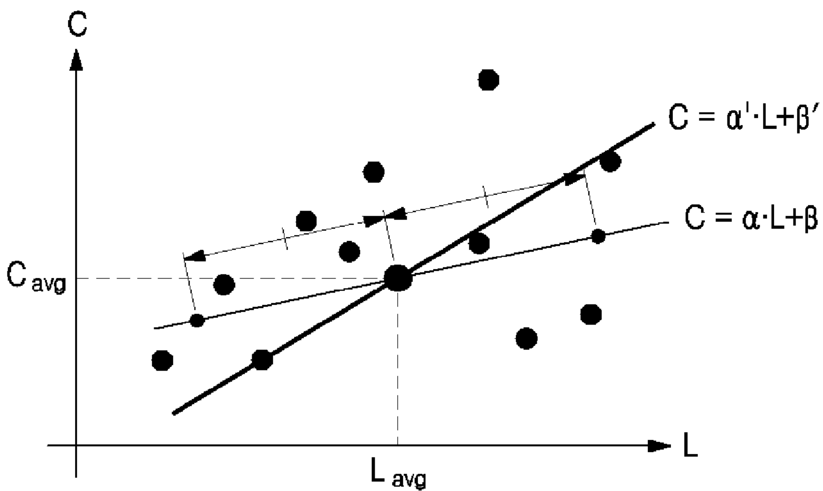
FIG. 16 is a diagram illustrating correction of a relation model according to an embodiment of the present disclosure.

FIG. 16 is a diagram illustrating correction of a relation model according to an embodiment of the present disclosure.

For example, the intra predictor 542 may determine a parameter Δα for correcting the slope a of the linear model using a lookup table and a signaled index. The lookup table may include preset values or values determined depending on α. In the case of adjusting α to α' using the correction parameter Δα, the intra predictor 542 may adjust β to β' so that the adjusted model includes an average value ($L_{avg}$, $C_{avg}$) of the samples used for deriving the model, as in the example of FIG. 16. Here, $L_{avg}$ is an average value of the luma samples used for deriving the model, and $C_{avg}$ is an average value of the chroma samples used for deriving the model. The method of adjusting α and β to α' and β' using Δα may be expressed as in Equation 2.

$$\alpha' = \alpha + \Delta\alpha, \quad \beta' = C_{avg} - \alpha' \cdot L_{avg} \qquad \text{[Equation 2]}$$

Hereinafter, an operation of predicting a chroma component is described.

The intra predictor 542 may predict a chroma component by converting a reconstructed luma component based on the luma-chroma cross-component relation model.

As an example, if the luma-chroma cross-component relation model is expressed by linear relationship parameters α and β, the chroma component prediction value $pred_C(i,j)$ at the (i,j) position may be expressed as in Mathematical Expression 3 by using the corresponding reconstructed luma component value $rec_L(i,j)$ $$pred_C(i, j) = \alpha \cdot rec_L(i, j) + \beta \qquad \text{[Equation 3]}$$

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
155: entropy encoder
510: entropy decoder
542: intra predictor

CROSS-REFERENCE TO RELATED APPLICATIONS

This application claims priority to and the benefit of Korean Patent Application No. 10-2022-0060670 filed on May 18, 2022, and Korean Patent Application No. 10-2023-0055540, filed on Apr. 27, 2023, the entire contents of each of which are incorporated herein by reference.

The invention claimed is:

1. A method of reconstructing a chroma component of a current block, performed by a video decoding device, the method comprising:

deriving temporary sampling positions from neighboring samples of the current block by using characteristics of a reconstructed luma component or neighboring samples of the current block, wherein the current block includes the luma component and the chroma component;

evaluating and adjusting the temporary sampling positions to select final positions for deriving a cross-component relation model between luma and chroma components;

deriving the cross-component relation model by using samples of the final positions; and generating chroma prediction values of the chroma component by applying the cross-component relation model to the luma component.

2. The method of claim 1, wherein the chroma component is a current chroma block or a current chroma subblock, and the luma component is a corresponding luma block, a corresponding luma region, a corresponding luma subblock, or a corresponding luma subregion.

3. The method of claim 2, wherein when a prediction mode of the luma component is a directional mode, deriving the temporary sampling positions includes:

acquiring an orthogonal projection range in which the corresponding luma block is orthogonally projected onto a straight line perpendicular to a prediction direction of the luma component; and dividing the orthogonal projection range into N sections (here, N is a positive integer of 2 or greater) with a same width and then determining positions of reference samples projected onto N points located at a center of the sections as the temporary sampling positions.

4. The method of claim 3, wherein deriving the temporary sampling positions includes:

when the prediction direction is smaller than a preset first angle or larger than a preset second angle, adjusting the orthogonal projection range so that top and left reference samples adjacent to the corresponding luma block are used, and including reference samples closer to the corresponding luma block in the temporary sampling positions instead of reference samples that may be used based on the prediction direction.

5. The method of claim 3, wherein deriving the temporary sampling positions includes:

when there is no chroma reference sample corresponding to the temporary sampling position selected based on the prediction direction, adjusting the orthogonal projection range to fit a luma reference sample region corresponding to a region in which the chroma reference sample exists.

6. The method of claim 2, wherein when a prediction mode of the luma component is a directional mode, deriving the temporary sampling positions includes:

acquiring an orthogonal projection range in which the corresponding luma block is orthogonally projected onto a straight line perpendicular to a prediction direction of the luma component; and dividing the orthogonal projection range into N−1 (here, N is a positive integer of 2 or greater) sections with a same width and then determining positions of reference samples projected onto N points located at boundaries of the sections as the temporary sampling positions.

7. The method of claim 2, wherein when a prediction mode of the luma component is a non-directional mode, deriving the temporary sampling positions includes:

acquiring an orthogonal projection range in which the corresponding luma block is orthogonal projected onto a straight line perpendicular to an arbitrary prediction direction; and dividing the orthogonal projection range into N sections (here, N is a positive integer of 2 or greater) with a same width and then determining positions of reference samples orthogonally projected onto N points located at a center of the sections as the temporary sampling positions, wherein the arbitrary prediction direction is a preset value or determined based on a size or aspect ratio of the corresponding luma block.

8. The method of claim 2, wherein deriving the temporary sampling positions includes:

dividing the corresponding luma block into M (here, M is a positive integer of 2 or greater) corresponding luma subblocks based on an edge included in the corresponding luma block, discontinuity of reference samples of the corresponding luma block, or discontinuity of reference samples of the current chroma block; and deriving temporary sampling positions of each corresponding luma subblock from neighboring samples of each corresponding luma subblock by using the reconstructed luma component of each corresponding luma subblock or characteristics of neighboring samples.

9. The method of claim 2, wherein deriving the temporary sampling positions includes:

determining a representative direction by using prediction directions used in a region adjacent to reference samples in the corresponding luma region; and determining temporary sampling positions of the corresponding luma region based on the representative direction.

10. The method of claim 1, wherein deriving the temporary sampling positions includes:

deriving temporary sampling positions of the chroma component from temporary sampling positions of the luma component based on a chroma subsampling format of the chroma component.

11. The method of claim 1, wherein selecting the final positions includes:

when a difference between an average pixel value of pixels included in an evaluation block and a pixel value at a temporary sampling position included in the evaluation block is greater than a threshold value, not using the temporary sampling position for deriving the cross-component relation model or adjusting the temporary sampling position, wherein the threshold value is determined based on the luma component or a distribution of pixel values in the evaluation block or is a preset value.

12. The method of claim 11, wherein the evaluation block includes a single temporary sampling position and has a fixed size or a size determined by a size, aspect ratio, or prediction direction of the luma component.

13. A method of predicting a chroma component of a current block, performed by a video encoding device, the method comprising:

deriving temporary sampling positions from neighboring samples of the current block by using characteristics of a reconstructed luma component or neighboring samples of the current block, wherein the current block includes the luma component and the chroma component;

evaluating and adjusting the temporary sampling positions to select final positions for deriving a cross-component relation model between luma and chroma components;

deriving the cross-component relation model by using samples of the final positions; and generating chroma prediction values of the chroma component by applying the cross-component relation model to the luma component.

14. The method of claim 13, wherein the chroma component is a current chroma block or a current chroma subblock, and the luma component is a corresponding luma block, a corresponding luma region, a corresponding luma subblock, or a corresponding luma subregion.

15. The method of claim 14, wherein when a prediction mode of the luma component is a directional mode, deriving the temporary sampling positions includes:

acquiring an orthogonal projection range in which the corresponding luma block is orthogonally projected onto a straight line perpendicular to a prediction direction of the luma component; and dividing the orthogonal projection range into N sections (here, N is a positive integer of 2 or greater) with a same width and then determining positions of reference samples projected onto N points located at a center of the sections as the temporary sampling positions.

16. The method of claim 14, wherein deriving the temporary sampling positions includes:

dividing the corresponding luma block into M (here, M is a positive integer of 2 or greater) corresponding luma subblocks based on an edge included in the corresponding luma block, discontinuity of reference samples of the corresponding luma block, or discontinuity of reference samples of the current chroma block; and deriving temporary sampling positions of each corresponding luma subblock from neighboring samples of each corresponding luma subblock by using the reconstructed luma component of each corresponding luma subblock or characteristics of neighboring samples.

17. The method of claim 14, wherein deriving the temporary sampling positions includes:

determining a representative direction using prediction directions used in a region adjacent to reference samples in the corresponding luma region; and determining temporary sampling positions of the corresponding luma region based on the representative direction.

18. The method of claim 13, wherein deriving the temporary sampling positions includes:

deriving temporary sampling positions of the chroma component from temporary sampling positions of the luma component based on a chroma subsampling format of the chroma component.

19. A method for providing a video decoding apparatus with video data, the method comprising:

encoding the video data into a bitstream; and transmitting the bitstream to the video decoding device;

wherein the encoding of the video data comprises:

deriving temporary sampling positions from neighboring samples of a current block by using characteristics of a reconstructed luma component or neighboring samples of the current block, wherein the current block includes the luma component and the chroma component;

evaluating and adjusting the temporary sampling positions to select final positions for deriving a cross-component relation model between luma and chroma components;

deriving the cross-component relation model by using samples of the final positions; and generating chroma prediction values of the chroma component by applying the cross-component relation model to the luma component.

* * * * *